3,171,440
BLEEDER VALVE
Pellegrino E. Napolitano, 1415 57th St., Brooklyn 19, N.Y.
Filed Jan. 4, 1961, Ser. No. 80,692
1 Claim. (Cl. 137—630.19)

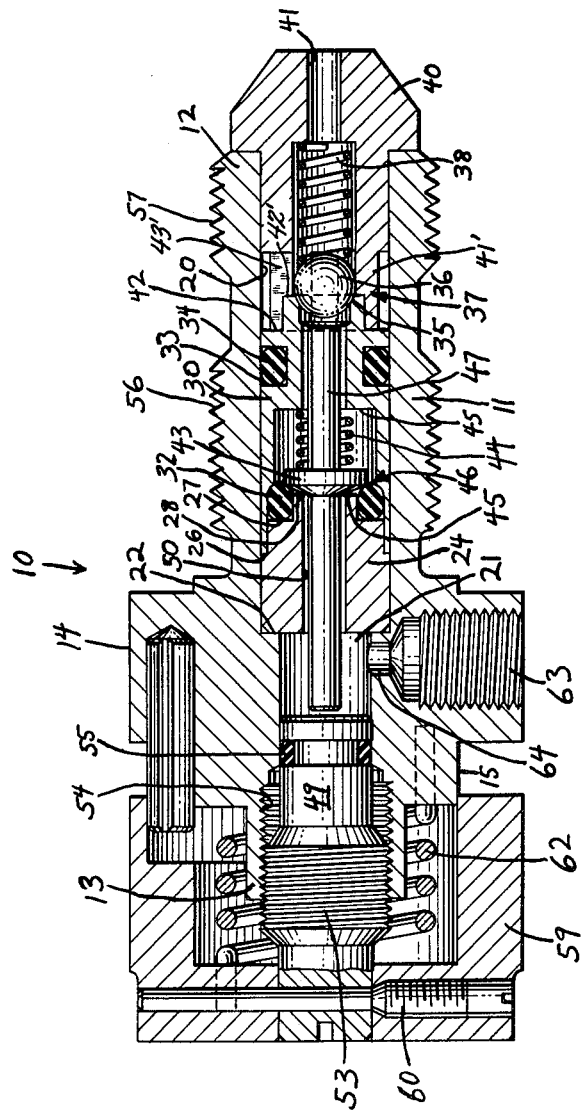

This invention relates to bleeder valves and, more particularly, to a new and improved compound bleeder valve.

In general, the presently-available bleeder valves, such as the valves, such as the one disclosed in my co-pending application Serial No. 805,498, filed April 10, 1959, now abandoned, are made so that they must sacrifice either effectiveness or durability. Although valves having mating elements made of metal or the like are quite durable, they tend to leak at high differential pressures, despite careful machining of the mating surfaces. On the other hand, valves employing an O ring seal of rubber or similar resilient mateirals, while effective in preventing high pressure leakage, are susceptible to rapid erosion of the sealing element by the high velocity fluid flow which may occur even when the valve is fully open. Moreover, in some cases an O ring is so distorted by rapidly-moving fluid as the valve closes that it can be mutilated by the associated metal parts of the valve.

Accordingly, it is an object of the present invention to provide a new and improved bleeder valve especially constructed to overcome the above-mentioned disadvantages of presently-available valves.

Another object of the invention is to provide a bleeder valve capable of sealing effectively at high differential pressures.

A further object of the invention is to provide a valve of the above character having a sealing element which is not subject to fluid erosion.

These and other objects of the invention are accomplished by providing in a single compound valve a novel structure including separate combinations of valve members and valve seats arranged in series. The valve member and valve seat nearer the high-pressure end are made entirely of metal and are designed to open after and close before the valve member and valve seat nearer the low-pressure end. The latter valve member and valve seat, which are thus protected from high-velocity flow during the opening and closing operations, have an O ring seal. Also, a reduced cross-sectional flow area on the low-pressure side of the second valve limits the velocity of flow past the O ring when the compound valve is fully open.

Further objects and advantages of the invention will be readily apparent from a reading of the following description in conjunction with the single drawing, which illustrates in longitudinal section a representative valve arranged according to the invention.

The typical valve 10 shown in the drawing has a generally tubular body 11 comprising a forward end section 12, a rear end section 13, and an intermediate section including a lateral flange 14 and an adjacent portion 15 of reduced diameter. In addition, the body 11 has an axial bore 20 with a reduced diameter portion forming a chamber 21 near the rear end of the bore and an internal shoulder 22 forming a seat for a sleeve 24 which is inserted in the bore. The exterior wall of the sleeve 24 is stepped inwardly to provide annular shoulders 26, 27, and 28, and the rear end of another sleeve 30 abuts the shoulder 26, an O ring 32 being positioned between the shoulder 27 and the inner surface of the sleeve 30. In addition, the sleeve 30 has an annular recess 33 near its forward end encompassed by another O ring 34 so as to form a seal between the sleeve 30 and the wall of the bore 20.

At its forward end, the sleeve 30 forms a valve seat 35 which cooperates with a ball 36 to form an all-metal ball valve 37, and this valve is normally held closed by a coil spring 38 which is compressed between the ball 36 and an interior shoulder in a nose cap 40. The nose cap 40 is secured by any convenient means to the forward end 12 of the body 11 and has a cylindrical bore which forms the inlet 41 for the compound valve 10. A longitudinally-slotted cylindrical portion 41' integral with and extending to the rear of the nose cap 40 fits tightly about a cylindrical projection 42' on the sleeve 30 and abuts a shoulder 42 of the sleeve 30 so that the sleeves 24 and 30 are maintained in sealing relation to the O ring 32. The portion 41' serves as a guide for the ball 36 when it is removed from its valve seat 35 as hereinafter described, and the longitudinal slots 43' facilitate passage of fluid around the ball 36 despite the close fit between the ball 36 and the portion 41'.

Within the sleeve 30, a poppet 43 is urged by a spring 44 abutting an interior shoulder 45 of the sleeve 30 against the O ring 32 forming a poppet valve 46 and, after the O ring has been compressed to form a seal between the poppet and the sleeve 24, the poppet is stopped by a seat 45 on the sleeve 24. Integral with the poppet 43 and extending in both directions therefrom is an axial shaft 47 which has a diameter sufficiently less than the internal diameters of the sleeves 24 and 30 to permit fluid flow therethrough. As shown in the drawing, the forward end of this shaft is spaced a selected distance from the ball 36 when both the valves 37 and 46 are in the closed condition.

By axial motion of a push rod 49 adjacent to the rear end of the shaft 47, the shaft can be moved forwardly so as to force the poppet 43 from its valve seat 45, thus opening both of the valves 46 and 37. However, because of the selected spacing between the forward end of the shaft 47 and the ball 36 when both of the valves 46 and 37 are in the closed condition, the ball 36 cannot be removed from its valve seat 35 until the poppet 46 is well away from its valve seat 45. Accordingly, during the opening of the valve 46 the O ring 32 will be protected from high-velocity fluid action by the still-closed valve 37. When the shaft 47 has moved the selected distance and the valve 37 begins to open, the valve 46 is open to such an extent that the velocity of the fluid in the vicinity of the O ring 32 is relatively low. Moreover, the maximum velocity of fluid flow at that point when both of the valves 46 and 37 are fully open can be made as low as may be desired by making the cross-sectional dimensions of the shaft 47 sufficiently great as compared to the cross-sectional dimensions of the bore 50 of the sleeve 24.

It is obvious that, because the distance between the valve seat 45 and the valve seat 35 is greater than the distance between the poppet 43 and the forward end of the shaft 47, when the compound valve 10 is closed the ball 36 will first return to its valve seat 35 and the poppet 43 will then return to its valve seat 45. Thus, the O ring 32 will be protected from high velocity fluid action in the same way during closing of the valve.

As described in my above-mentioned copending application, an external thread 53 on the push rod 49 engages a complementary thread 54 in the bore 20 at the portion 13 of the body 11 so that rotary motion of the push rod in the proper direction advances it against the rear end of the shaft 47 to move the shaft. To rotate the push rod 49, which carries an O ring 55 forming a seal with the bore 20, an external cap 59 is joined to the rod by a transverse pin 60, the cap and push rod being urged toward the closed position by a torsion spring 62. An outlet opening 63 leads from the chamber 21 and, if desired, a restricted throat 64 may be provided at this point to further impede the fluid flow, thereby reducing the velocity through the valve 46. When the compound valve 10 is in use, it is secured in an object such as a pipeline, tank or bulkhead (not shown) by means of screw threads 56 and 57 so that the inlet 41 communicates with the fluid under pressure.

In operation, to open the valve the cap 59 is rotated so as to effect forward axial movement of the push rod 49 by reason of the engagement of the threads 53 and 54. As previously mentioned this moves the shaft 47 forwardly to first open the valve 46 and then, after this valve is opened an appreciable amount, open the valve 37. When the valve 37 is open, fluid flows through a fluid-flow channel defined by the inlet 41, the bore 20, the valve 37 and the valve 46, and out the outlet opening 63. To stop further bleeding, it is necessary merely to release the cap 59 so that the coil spring 62 returns the cap and the push rod 49 to the closed position.

Inasmuch as the sleeves 24 and 30, which define the valve seats 45 and 35, respectively, are separate units, they may readily be machined to the desired tolerances for effecting a seal with their associated valve members and with the wall of the bore 20. Further, because of the arrangement of two valves in series much greater valve effectiveness results from any given tolerances. Also, if the valve seats should become worn they may readily be replaced so that there is no need to discard the entire compound valve 10.

Thus there is provided in accordance with the invention a valve having exceptional ability to prevent fluid leakage under great pressure differentials despite repeated openings and closings but which, nevertheless, is simple mechanically and easy to manufacture and repair. Many modifications in form and detail of the representative embodiments of the invention disclosed herein will be readily apparent to the workmen skilled in the art. Accordingly, all such modifications and variations are included within the intended scope of the invention as defined in the following claim.

I claim:

A bleeder valve comprising a body portion having a stationary bore with an inlet and an outlet, valve means including at least one movable valve member and one movable valve stem mounted within said stationary bore, said valve means being shiftable between a closed state in which said valve means forms a resilient closure and a second closure in series in said stationary bore and an open state in which said valve means permits fluid flow through said stationary bore, said resilient closure comprising an O-ring mounted in stationary relation to said bore and co-operating in the formation of a stationary valve seat, and said valve member therefore being movable with respect to said stationary O-ring, at least a portion of said movable valve stem having an outer surface co-operating in the formation of a fluid-flow channel remote from said O-ring and maintaining the cross-sectional flow area of said fluid-flow channel adjacent to said surface substantially constant when said valve means is in said open state to make a portion of said channel remote from said O-ring the area of maximum flow velocity and thereby minimize the maximum velocity of fluid flow adjacent to the locus of said O-ring and prevent erosion of said O-ring when said valve means is in said open state, guide means mounted in said bore and fitting closely about at least a portion of said one valve member for guiding said portion of said one valve member in said open state, by-pass means formed in said guide means for directing fluid flow around said portion in said open state, means connected to said valve means for shifting said valve means from said closed state to said open state, whereby said resilient closure is opened prior to said second closure, and means connected to said valve means for shifting said valve means from said open state to said closed state, whereby said second closure is closed prior to said resilient closure.

References Cited in the file of this patent

UNITED STATES PATENTS

| | | |
|---|---|---|
| 902,786 | Whitney | Nov. 3, 1908 |
| 1,136,606 | Loyd | Apr. 20, 1915 |
| 1,879,322 | Kniskern | Sept. 27, 1932 |
| 2,221,100 | Lear | Nov. 12, 1940 |
| 2,610,063 | Faucheux | Sept. 9, 1952 |
| 2,800,142 | Champion | July 23, 1957 |
| 2,868,224 | Karlsson | Jan. 13, 1959 |
| 2,905,487 | Shifter | Sept. 22, 1959 |
| 3,002,528 | Leissner | Oct. 3, 1961 |

FOREIGN PATENTS

| | | |
|---|---|---|
| 982,248 | France | of 1951 |